(12) United States Patent
Bhattacharyya et al.

(10) Patent No.: US 6,591,870 B1
(45) Date of Patent: Jul. 15, 2003

(54) ENERGY ATTENUATION RESTRICTOR DEVICE AND METHOD OF FORMING SUCH RESTRICTOR DEVICE

(75) Inventors: Jayanta Bhattacharyya, Ocala, FL (US); Terence E. Skiba, Ocala, FL (US)

(73) Assignee: Dayco Products, LLC, Miamisburg, OH (US)

( * ) Notice: Subject to any disclaimer, the term of this patent is extended or adjusted under 35 U.S.C. 154(b) by 0 days.

(21) Appl. No.: 10/104,379

(22) Filed: Mar. 22, 2002

(51) Int. Cl.[7] ............................................... F16L 55/04
(52) U.S. Cl. ..................... 138/26; 138/30; 138/113; 138/114; 181/255
(58) Field of Search ............................ 138/30, 26, 44, 138/114, 113, 112, 109; 181/233, 252, 249, 255

(56) References Cited

U.S. PATENT DOCUMENTS

| | | | |
|---|---|---|---|
| 3,323,305 A | | 6/1967 | Klees ........................ 138/26 X |
| 4,285,534 A | * | 8/1981 | Katayama et al. ........... 285/119 |
| 4,371,053 A | | 2/1983 | Jones ........................ 181/249 |
| 4,501,341 A | | 2/1985 | Jones ........................ 181/250 |
| 4,611,633 A | * | 9/1986 | Buchholz et al. ............. 138/26 |
| 4,671,380 A | | 6/1987 | Henderson et al. .......... 181/233 |
| 4,828,068 A | * | 5/1989 | Wendler et al. ............. 180/428 |
| 5,094,271 A | * | 3/1992 | Fritz et al. .................... 138/30 |
| 5,168,855 A | | 12/1992 | Stone ......................... 123/446 |
| 5,172,729 A | * | 12/1992 | Vantellini .................... 138/26 |
| 5,201,343 A | * | 4/1993 | Zimmermann et al. ........ 138/26 |
| 5,475,976 A | * | 12/1995 | Phillips ...................... 60/327 |
| 5,495,711 A | * | 3/1996 | Kalkman et al. ............. 60/469 |
| 5,509,391 A | | 4/1996 | DeGroot ..................... 123/467 |
| 5,582,006 A | * | 12/1996 | Phillips ...................... 60/327 |
| 5,941,283 A | * | 8/1999 | Forte ......................... 138/26 |
| 5,983,946 A | * | 11/1999 | Chen et al. .................. 138/30 |
| 6,073,656 A | | 6/2000 | Chen et al. .................. 138/26 |
| 6,123,108 A | | 9/2000 | Chen et al. .................. 138/30 |
| 6,155,378 A | * | 12/2000 | Qatu et al. .................. 181/255 |
| 6,158,472 A | * | 12/2000 | Hilgert ....................... 138/26 |
| 6,269,841 B1 | * | 8/2001 | Chen et al. .................. 138/30 |
| 6,279,613 B1 | * | 8/2001 | Chen et al. .................. 138/30 |
| 6,338,363 B1 | * | 1/2002 | Chen et al. .................. 138/26 |
| 6,360,777 B1 | * | 3/2002 | Bae ............................. 138/30 |
| 6,478,053 B2 | * | 11/2002 | Zanardi ...................... 138/30 |

OTHER PUBLICATIONS

M. L. Munjal, "Acoustics of Ducts and Mufflers", 1945, pps. 71–72, Copyright 1987 by John Wiley & Sons, Inc., U.S.A. and Canada.

* cited by examiner

*Primary Examiner*—Patrick Brinson
(74) *Attorney, Agent, or Firm*—Joseph V. Tassone

(57) ABSTRACT

An energy attenuation restrictor device for use in an energy attenuation apparatus for a conduit adapted to convey a liquid under pressure, particularly, in the power steering system of a vehicle wherein said energy attenuation restrictor device includes a tuning cable composed of a first organic polymer and a fitting member composed of a second organic polymer, and a method for molding the energy attenuation restrictor device are described.

29 Claims, 2 Drawing Sheets

ENERGY ATTENUATION RESTRICTOR DEVICE AND METHOD OF FORMING SUCH RESTRICTOR DEVICE

BACKGROUND OF THE INVENTION

This invention relates to energy attenuation apparatus and more particularly to a new energy attenuation restrictor device for use in an energy attenuation apparatus adapted to convey liquid under pressure for the attenuation of pressure pulsations in the liquid and to a method for manufacturing a restrictor device. The restrictor device of the invention is especially useful in the energy attenuation apparatus of the hydraulic system of a power steering unit of a vehicle. The invention would also be suitable for other hydraulic systems.

In hydraulic systems where the operating liquid is circulated by a pump, the pulsations of pressure generated by the pump are transmitted through the conduits and result in noise and/or vibration being produced by the hydraulic liquid. In the case of power steering fluid in vehicles, such noise and/or vibration are caused, for example, when a vehicle is being operated at idle or very low speeds of movement such as barely moving into and out of a parking space where the wheels of the vehicle are being turned by the power steering mechanism. In those instances where the wheels are being turned with little or no rolling of the wheel, substantial noise and/or vibration (shudder) can be produced when the power steering fluid passes through the power steering mechanism from the power steering pump to the effective steering structure. Further background in this area can be found in U.S. Pat. No. 3,323,305 to Klees which is incorporated herein by reference thereto.

Devices are known for suppressing noise in exhaust gas mufflers. For example, U.S. Pat. No. 4,501,341 to Jones provides two side branch resonators, while U.S. Pat. No. 4,371,053 to Jones provides an apertured tube in a gas muffler housing. Systems are also known for controlling the resonation of pressure waves in fuel injection systems. For examples, U.S. Pat. No. 5,168,855 to Stone passes fluid through check valves that are provided with a flow restriction either directly therein or in a bypass line. U.S. Pat. No. 5,509,391 to DeGroot provides a spool valve assembly for controlling flow between inlet and outlet ports. Henderson et al., in U.S. Pat. No. 4,671,380, discloses a long and narrow tubular casing having a perforated tube extending therethrough. Finally, "Acoustics of Ducts and Mufflers", by M. L. Munjal, describes an apertured resonator tube disposed in a tubular cavity for conveying gas.

Commonly assigned U.S. Pat. Nos. 6,073,656 and 6,123,108, both to Chen et al., the contents of which are incorporated herein by reference thereto, describe energy attenuation apparatus providing tubular means having an inlet opening for receiving liquid from the system, and an outlet opening for returning the liquid to the system, wherein an inlet conduit extends concentrically into the tubular means through the inlet opening such that an annular space is formed between the inlet conduit and the tubular means. In a portion of the inlet conduit disposed in the tubular means, the inlet conduit is provided with at least one aperture for introducing liquid from the inlet conduit into the annular space between the inlet conduit and the tubular means.

Applicants are not aware of any other teaching of transferring flow of liquid under pressure from one tube to another as a means of suppressing energy, especially where at least one of the tubes is provided with at least one hole.

SUMMARY OF THE INVENTION

It is an object of the present invention to provide an improved energy attenuation restrictor device for attenuating energy in a conduit that conveys liquid under pressure.

It is another object of the invention to provide a method for manufacturing an improved energy attenuation restrictor device for attenuating energy in a conduit that conveys liquid under pressure.

In a pressurized liquid system, such as a power steering system in an automobile, pressurized liquid is generated and transmitted through tubing, such as steel tubing, to a pressure line, a power steering gear, a fluid return line, a reservoir and finally back to the pump itself. During the generation and transmission of the fluid under pressure, pressure ripples are also generated and transmitted through the tubing. In order to reduce such pressure ripples before they reach the gear, and thereby eliminate or at least greatly reduce the power steering noise or vibration generated by the power steering pump, an energy attenuation device such as that described in the above commonly assigned U.S. Pat. Nos. 6,073,656 and 6,123,108 to Chen et al., is disposed in the pressure line between the power steering pump and the gear.

Currently, the restrictor device for attenuating energy, commonly referred to a tuning cable assembly, consists of a tuning cable which may be constructed of a metal or a polymeric material, and a metal fitting member annularly disposed around one end of the tuning cable and held in place by friction. This fitting member including the tuning cable is inserted into a metal support member which is crimped to hold the fitting member and the tuning cable in place in the metal support member. The tuning cable assembly anchored to the metal member is then inserted into a housing or, preferably a hose and kept in place by a metallic shell which is crimped onto the hose.

In the present invention, both the tuning cable and the fitting member of the restrictor device are manufactured from a polymeric material. Both parts may be made of the same plastic material or they may be made from different plastic materials. By using polymeric materials to manufacture both the tuning cable and the fitting member in accordance with the present invention, the inventive restrictor device is more conveniently recyclable, lower in cost, lighter in weight, and, more importantly, consists of fewer parts. In a particularly preferred and advantageous embodiment of the invention, the present restrictor device is manufactured in a single step in an injection molding machine wherein the tuning cable and the fitting member, are simultaneously molded together forming a unitary restrictor device.

DETAILED DESCRIPTION OF THE INVENTION

One aspect of the invention is a new restrictor device for use in an energy attenuation apparatus which not only reduces the number of parts needed to construct the restrictor device, but also provides a device which is lighter in weight, lower in cost, easier to manufacture and recycle than prior art restrictor devices.

Another aspect of the invention is a method for the manufacture of the restrictor device which allows the device to be constructed as a single unit or from separate parts.

Still another aspect of the invention is in the use of the new restrictor device of the present invention to attenuate energy in a conduit adapted to convey a liquid under pressure.

In accordance with the invention, both the tuning cable and the fitting member of the energy attenuation apparatus of an automobile power steering system are constructed from polymeric materials. The polymeric materials may or may not be similar in composition. If the materials used to construct the tuning cable and the fitting member are not the same or at least similar in composition, or if they are incompatible, it will be necessary to provide a means for securing the fitting member and the tuning cable together. Preferably the tuning cable and the fitting member are constructed from polymeric materials which are similar in composition or have the same composition, or are compatible.

The energy attenuation restrictor device of this invention is lighter in weight; lower in cost; consists of fewer parts; and is more conveniently recyclable than the attenuation restrictor devices presently in use in the industry. In addition to the above advantages, the present attenuation restrictor device can be conveniently manufactured in a single molding process, depending upon the particular polymeric materials used to manufacture the restrictor device.

Figure 1:
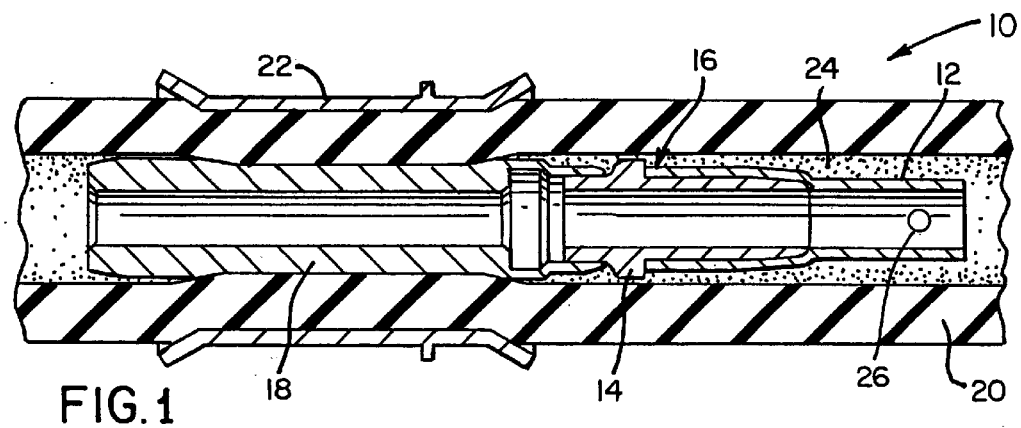
FIG. 1 is a sectional view of an exemplary energy attenuation apparatus containing a prior art restrictor device.

Referring now to the drawings in detail, FIG. 1 illustrates a prior art restrictor device 10 for attenuating energy. The restrictor device 10 consists of a tuning cable 12 which may be constructed of a metal or a polymeric material, and a metal fitting member 14 annularly disposed around one end of the tuning cable 12 to form a tuning cable assembly 16. The tuning cable 12 and metal fitting member 14 are held in place by friction. The tuning cable assembly 16 is inserted into a metal support member 18 which is crimped to hold the metal fitting member 14 and the tuning cable 12 in place in the metal support member 18. The metal tuning cable assembly 16 anchored to the metal support member 18 is then inserted into a rubber hose 20 and kept in place by a metallic shell 22 which is crimped onto the hose 20. A narrow annular space 24 of from about 1/32 to 3/8 of an inch or longer is formed between the outer periphery of the tuning cable 12 and the inner periphery of the hose 20. The narrow annular space 24 is formed to receive hydraulic fluid from the tuning cable 12 via one or more apertures 26 in the tuning cable 12. The distance between the outer periphery of the tuning cable 12 and the inner periphery of the hose 20 forming the annular space 24 is about 1/32 to 3/8 of an inch. Various other embodiments and configurations of the energy attenuation apparatus and components and arrangements thereof are described in commonly assigned U.S. Pat. Nos. 6,073,656 and 6,123,108, the contents thereof being incorporated herein by reference thereto.

Figure 2:
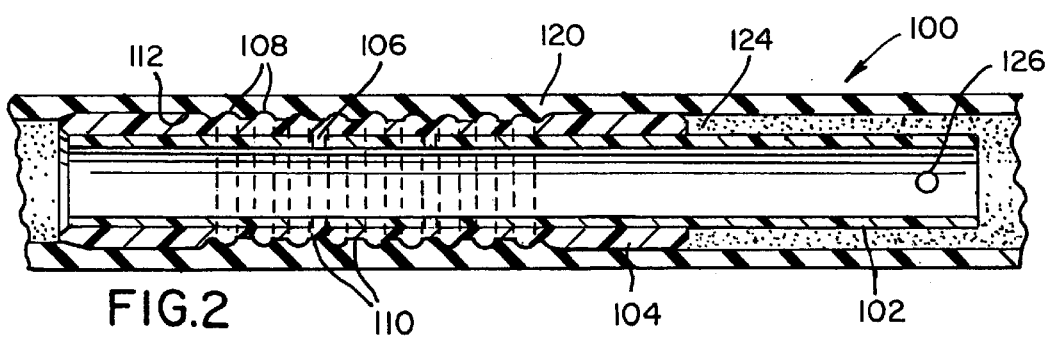
FIG. 2 is a sectional view of an energy attenuation assembly containing one embodiment of a restrictor device of the present invention.

FIG. 2 represents one embodiment of the present invention which consists of a restrictor device 100 wherein the tuning cable 102 is molded over by the polymeric fitting 104, e.g., in an injection molding machine or transfer molding. In this embodiment, different materials may be employed to manufacture the tuning cable 102 and the polymeric fitting member 104. If the materials are different or not compatible, it may be necessary to form one or more locking structures 106 in or on either the tuning cable 102 or the fitting 104. For example, where the materials have a different melting point, one of the parts such as the tuning cable 102 can be constructed from the material having the higher melting point and the fitting member 104 can be formed from a material having the lower melting point. In this case the tuning cable 102 formed from the higher melting polymer would be formed with one or more locking structures therein, and the fitting member 104 constructed from the lower melting polymer typically would be molded over the tuning cable 102 so that the lower melting polymeric material would flow into or around the locking structures 106, thereby permanently securing the tuning cable 102 to the fitting member 104. As shown in FIG. 2, the locking structure 106 is illustrated as being in the form of a hole formed in the tuning cable 102 constructed from a relatively high melting polymeric material. As the fitting member 104, constructed from a relatively low melting polymeric material, is molded over the locking structure 106 the lower melting polymeric material fills the hole and, upon cooling, forms a solid pin therein to lock the tuning cable 102 and the fitting member 104 together. The locking structures 106 may be of any configuration, e.g., a depression such as one or more circular holes, oval holes, elongated slots, grooves, or the locking structure may be a protrusion such as one or more pins, rods, etc.

Figure 3:
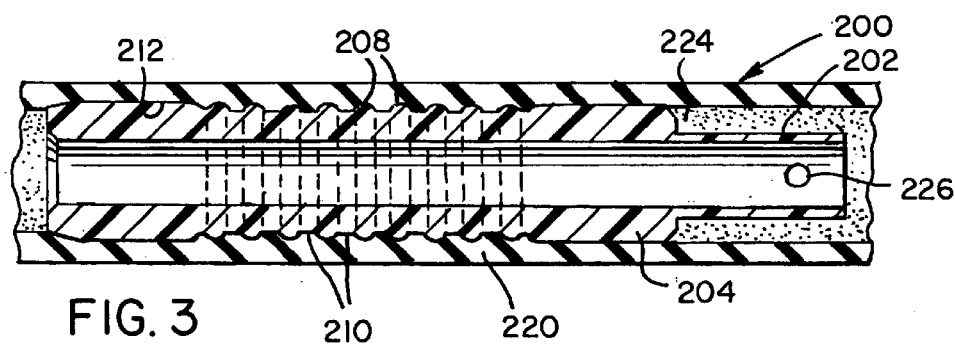
FIG. 3 is a sectional view of an energy attenuation assembly containing another embodiment of restrictor device of the present invention.

FIG. 3 represents another embodiment of the restrictor device 200 of the present invention wherein the tuning cable 202 and the polymeric fitting member 204 are constructed from the same material. Because the two parts are constructed from the same material, they can be molded simultaneously in a single molding apparatus such as by injection molding, wherein the tuning cable 202 and the fitting member 204 are formed as the unitary restrictor device 200.

The tuning cable and the fitting member making up the restrictor device of the present invention may be fabricated from any known polymeric material which is compatible with the conditions of the intended use of the restrictor device. For example, if the restrictor device is employed in a system requiring high temperatures and/or pressure, the polymeric material must be capable of withstanding such high temperatures and/or pressures. Furthermore, the polymeric material must be inert with respect to the atmosphere in which it is used, and resistant to any chemicals that it may contact. Typically the parts of the restrictor device 200 are constructed from high melting polymeric materials, e.g., polyamides, such as nylons; and halogenated hydrocarbon polymers, such as teflon. Preferably, both the tuning cable and the fitting member are constructed from compatible polymeric materials such as nylons, e.g., 6,6 nylon; glass filled nylon 6,6; nylon 6; glass filled nylon 6; nylon 4,6; glass filled nylon 4,6; nylon 11 and glass filled nylon 11, etc. However, in certain applications where the device is used to circulate fluid or gas at a relatively low temperature, e.g., room temperature or slightly above room temperature, other lower melting polymeric materials such as polyolefins, e,g., polyethylene, high density polyethylene (HDPE), ultra high density polyethylene (UHDPE), polypropylene; polyesters, polyurethanes or thermoplastic elastomers having elongation at break more than 15% etc. may be employed to form either the tuning cable 202 or the fitting member 204 or both.

The structures of FIGS. 2 and 3 are further illustrated as exhibiting multiple annular ridges on the outer surface of the polymeric fitting member to provide a ripple-like effect. These annular ridges exhibit an irregular surface which, when in contact with the rough inner surface of the rubber hose, improves surface contact between the two surfaces and improves pull-off resistance. Furthermore, the annular ridges provide increased structural strength of the filling member. In FIG. 2, multiple annular ridges 108 and annular valleys 110 are shown on the outer surface of polymeric fitting member 104 for gripping the irregular inner surface 112 of rubber hose 120 when assembled thereto. In a similar manner, the embodiment of FIG. 3 also includes a plurality of annular ridges 208 and annular valleys 210 on the outer surface of polymeric fitting member 204 for gripping the irregular inner surface 212 of rubber hose 200. These ridges and valleys are illustrated as being annular along the axis of the respective restrictor devices; however, other configurations are possible such as protrusions and indentations, and the like. The number of annular ridges and annular valleys formed on the outer surface of the polymeric fitting members is not critical as long as the ridges and valleys provide adequate gripping characteristics to prevent the fitting member from being pulled out of the hose and adequate strength to the part.

While, as shown in FIGS. 2 and 3, the energy attenuation devices of the present invention (100, 200) generally include one or more apertures (126, 226) in the tuning cable (102, 202) and a narrow annular space (124, 224) formed between the outer periphery of the tuning cable (102, 202) and the inner periphery of the hose (120, 220) for receiving hydraulic power steering fluid from the tuning cable (102, 202) through the apertures (126, 226), the present energy attenuation devices (100, 200) do not need the metal support member which is required in the prior art energy attenuation devices.

Figure 4:
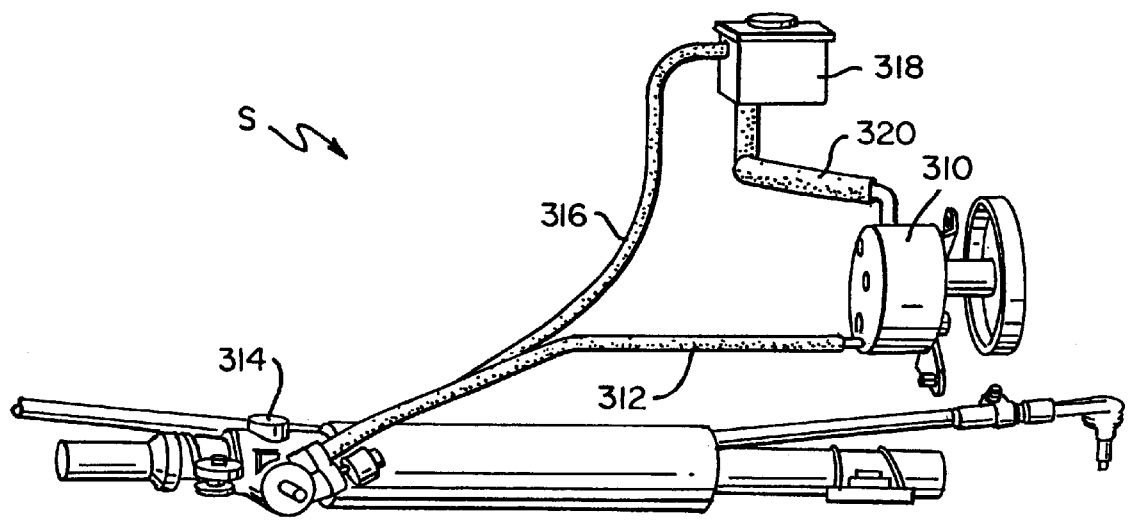
FIG. 4 illustrates a power steering system utilizing an energy attenuation apparatus containing a restrictor device of the present invention.

FIG. 4 illustrates a simplified automotive power steering system S. During operation, the power steering pump 310 generates pressure ripples that are transmitted through tubing, such as steel tubing, to the pressure line 312, the power steering gear 314, the return line 316, and the reservoir 318, and finally flow back to the pump 310 itself by means of the supply line 320. In accordance with the present invention, a proposed power steering system utilizes the new restrictor device of the present invention to greatly reduce such pressure ripples before they reach the power steering gear 314 via the pressure line 312. The new energy attenuation restrictor device as shown in FIGS. 2 and 3, but not shown in FIG. 4 of the present invention is disposed in the pressure line 312 between the pump 310 and the gear power steering gear 314.

Figure 5:
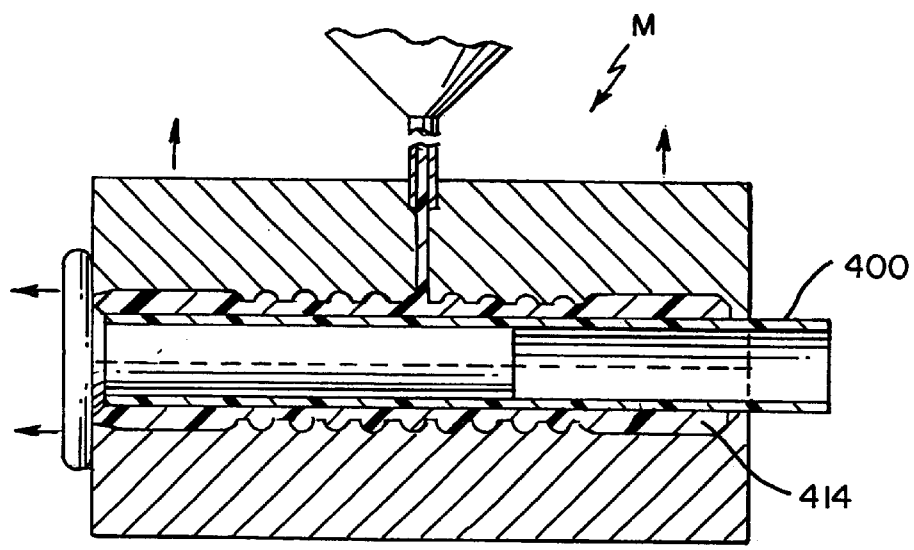
FIG. 5 illustrates a schematic diagram of a molding process for the manufacture of a restrictor device of the present invention.

An apparatus for constructing a restrictor device 400 of the present invention is shown in schematic form in FIG. 5 wherein an injection molding machine M is used to mold either or both of the polymeric tuning cable 400 and the polymeric fitting member 414. In one embodiment of the invention, the polymeric tuning cable and the polymeric fitting member 414 are molded separately and then fitted together in a separate step. In this embodiment, it may be necessary to provide a means for adhering the two parts together. One such means would be to use an adhesive which is compatible with both of the molded parts, or the tuning cable may be held in place in said fitting member by friction. Alternatively, one of the two parts is formed with one or more apertures and the second part is then over molded on the first part such that the molten material of the second part, having a lower melting point than that of the first part, would flow into the aperture(s) in the first part and lock the two parts together upon cooling. The restrictor device formed in accordance with this invention is illustrated in FIG. 2. In a preferred method of manufacturing the restrictor device of the invention, both the tuning cable and the fitting member are constructed from the same, or at least similar or compatible, polymeric materials. The restrictor device in accordance with this embodiment of the invention is illustrated in FIG. 3.

While the restrictor device and the methods for constructing and using the energy attenuation restrictor device of the present invention have been illustrated and described, it is to be understood that a person having ordinary skill in the art will recognize other materials and method steps which can be utilized in the manufacture and use of energy attenuation restrictor devices without departing from the scope of the appended claims.

What is claimed is:

1. An energy attenuation restrictor device for use in an energy attenuation apparatus adapted to convey a liquid under pressure for the attenuation of pressure pulsations in the liquid, comprising:
   a tuning cable composed of an organic polymer, said tuning cable comprising a tubular wall structure having an inner surface and an outer surface, and
   a fitting member composed of an organic polymer, said fitting member comprising a tubular wall structure having an inner surface and an outer surface wherein said fitting member is disposed on one end of said tuning cable such that an inner surface of fitting member is adjacent to or continuous with said outer surface of said tuning cable, said tuning cable and said fitting member being fabricated from an organic polymer possessing characteristics such that said device is compatible with the environment in which it is employed.

2. The energy attenuation restrictor device of claim 1 wherein said tuning cable is composed of an organic polymer selected from the group consisting of polyamides, halogenated hydrocarbon polymers, polyolefins and polyesters, polyurethanes and thermoplastic elastomers having elongation at break more than 15%.

3. The energy attenuation restrictor device of claim 2 wherein said tuning cable is composed of a polyamide.

4. The energy attenuation restrictor device of claim 3 wherein said polyamide is nylon.

5. The energy attenuation restrictor device of claim 4 wherein said nylon is selected from the group consisting of nylon 6,6; glass filled nylon 6,6; nylon 6; glass filled nylon 6; nylon 4,6; and glass filled nylon 4,6.

6. The energy attenuation device of claim 5 wherein said nylon is nylon 6,6 or glass filled nylon 6,6.

7. The energy attenuation restrictor device of claim 1 wherein said fitting member is composed of an organic polymer selected from the group consisting of polyamides, halogenated hydrocarbon polymers, polyolefins, polyesters, polyurethanes and thermoplastic elastomers having elongation at break more than 15%.

8. The energy attenuation restrictor device of claim 7 wherein said fitting member is composed of a polyamide.

9. The energy attenuation restrictor device of claim 8 wherein said polyamide is nylon.

10. The energy attenuation restrictor device of claim 9 wherein said nylon is nylon 6,6; glass filled nylon 6,6; nylon 6; glass filled nylon 6; nylon 4,6; and glass filled nylon 4,6.

11. The energy attenuation restrictor device of claim 10 wherein said nylon is nylon 6,6 or glass filled nylon 6,6.

12. The energy attenuation restrictor device of claim 1 wherein said fitting member further includes gripping and strengthening means on the outer surface thereof to enhance pull-off resistance of said energy attenuation restrictor device from a hose in which said energy attenuation restrictor device is fitted and to provide enhanced strength thereto.

13. The energy attenuation restrictor device of claim 12 wherein said gripping means includes a plurality of annular ridges on the outer surface of said fitting member.

14. The energy attenuation restrictor device of claim 1 wherein said tuning cable and said fitting member are composed of incompatible polymeric materials, said tuning cable and said fitting member being secured to each other by an adhesive.

15. The energy attenuation restrictor device of claim 1 wherein said tuning cable and said fitting member are composed of incompatible polymeric materials, said tuning cable and said fitting member being secured to each other by forming one of said tuning cable and said fitting member from a first polymeric material having a first melting point and forming the other of said tuning cable and said fitting member from a second polymeric material having a second melting point, said first polymeric material exhibiting a melting point different from the melting point of said second polymeric material wherein a locking member is formed in the polymeric material having a higher melting point.

16. The energy attenuation restrictor device of claim 15 wherein said locking member is an aperture or a protrusion and said polymeric material having a lower melting point flows into said aperture or around said protrusion upon constructing said restrictor device such that, upon cooling said device, the first and second polymeric materials are locked together.

17. The energy attenuation restrictor device of claim 1 wherein said tuning cable and said fitting member are composed of compatible polymer materials, said tuning cable and said fitting member being constructed to form a molded unitary device.

18. The energy attention restrictor device of claim 1 wherein said energy attenuation restrictor device is constructed in an injection molding apparatus.

19. The energy attenuation restrictor device of claim 1 wherein said energy attenuation restrictor device is connected to said pressure line in a power steering system of a vehicle.

20. The energy attenuation restrictor device of claim 19 wherein said energy attenuation restrictor device is connected to said pressure line between a power steering pump and a power steering gear.

21. An energy attenuation restrictor device for use in an energy attenuation apparatus for the attenuation of pressure pulsations in the liquid in a power steering system of a vehicle wherein the energy attenuation restrictor device is molded in an injection molding apparatus as a unitary structure, comprising:

a tuning cable composed of a nylon or a glass filled nylon, said tuning cable comprising a tubular wall structure having an inner surface and an outer surface, and a fitting member composed of a nylon or a glass filled nylon, said fitting member comprising a tubular wall structure having an inner surface and an outer surface, said outer surface of said fitting member further including a plurality of ridges thereon to improve structural strength of said fitting member and enhance pull-off resistance of said fitting member from a hose in which said energy attenuation restrictor device is fitted, said fitting member being disposed on one end of said tuning cable such that an inner surface of fitting member is adjacent to or continuous with said outer surface of said tuning cable.

22. In restrictor device for use in an energy attenuation apparatus in a conduit adapted to convey a liquid under pressure for the attenuation of pressure pulsations in the liquid employed in a power steering system in a vehicle wherein said restrictor contains a tuning cable, a fitting member and a metal support member for providing structural stability and strength to said restrictor device, the improvement of which comprises forming a unitarily formed energy attenuation restrictor device having polymeric tuning cable and a polymeric fitting member, said polymeric fitting member having a plurality of annular ridges formed on the outer surface thereof to improve structural strength of said fitting member and to provide enhanced pull off resistance to said restrictor device wherein said polymeric tuning cable and said polymeric fitting member are formed from the same or compatible polymeric materials having the same or similar melting points, said polymeric tuning cable and said polymeric fitting member being molded simultaneously in an injection molding machine to form a molded unitary energy attenuation restrictor device.

23. The restrictor device of claim 22 wherein said polymeric tuning cable and said polymeric fitting member are formed from a polyamide.

24. The restrictor device of claim 23 wherein said polyamide is nylon or glass filled nylon.

25. The energy attenuation restrictor device of claim 1 wherein said tuning cable is held in place in said fitting member by friction.

26. An energy attenuation restrictor device for use in an energy attenuation apparatus adapted to convey a liquid under pressure for the attenuation of pressure pulsations in the liquid, comprising:

a tuning cable composed of an organic polymer selected from the group consisting of polyamides, halogenated hydrocarbon polymers, polyolefins, polyesters, polyurethanes and thermoplastic elastomers having elongation at break more than 15%, said tuning cable comprising a tubular wall structure having an inner surface and an outer surface, and a fitting member composed of an organic polymer selected from the group consisting of polyamides, halogenated hydrocarbon polymers, polyolefins, polyesters, polyurethanes and thermoplastic elastomers having elongation at break more than 15%, said fitting member comprising a tubular wall structure having an inner surface and an outer surface wherein said fitting member is disposed on one end of said tuning cable such that an inner surface of said fitting member is adjacent to said outer surface of said tuning cable, wherein said tuning cable is held in place in said fitting member by friction.

27. The energy attenuation restrictor device of claim 26 wherein each of said tuning cable and said fitting member is composed of a polyamide.

28. The energy attenuation restrictor device of claim 27 wherein said polyamide is nylon or glass filled nylon.

29. The energy attenuation restrictor device of claim 28 wherein said nylon or glass filled nylon is nylon 6,6; glass filled nylon 6,6; nylon 6; glass filled nylon 6,6; nylon 4,6; or glass filled nylon 4,6.

* * * * *